(12) United States Patent
Tan

(10) Patent No.: US 10,796,218 B2
(45) Date of Patent: Oct. 6, 2020

(54) COMMUNICATIONS SYSTEM WITH SMART AGENT ROBOTS FOR ACCESSING MESSAGE DATA

(71) Applicant: Gemtek Technology Co., Ltd., Hsinchu (TW)

(72) Inventor: Der-Hwa Tan, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 712 days.

(21) Appl. No.: 15/452,739

(22) Filed: Mar. 8, 2017

(65) Prior Publication Data

US 2018/0144236 A1    May 24, 2018

(30) Foreign Application Priority Data

Nov. 24, 2016    (TW) .............................. 105138544 A (51) Int. Cl.
*G06N 3/00*    (2006.01)
*G06N 20/00*    (2019.01)
*H04L 12/58*    (2006.01)

(52) U.S. Cl.
CPC .............. *G06N 3/006* (2013.01); *G06N 20/00* (2019.01); *H04L 51/02* (2013.01); *H04L 51/046* (2013.01); *H04L 51/32* (2013.01)

(58) Field of Classification Search
CPC ......... H04L 51/02; H04L 51/32; G06N 3/006; G06N 20/00
See application file for complete search history.

(56) References Cited

U.S. PATENT DOCUMENTS

| | | | |
|---|---|---|---|
| 6,907,571 B2* | 6/2005 | Slotznick | G06Q 10/107 706/11 |
| 8,738,739 B2* | 5/2014 | Makar | G06Q 10/10 709/219 |
| 2011/0213642 A1 | 9/2011 | Makar | |
| 2012/0245944 A1 | 9/2012 | Gruber | |
| 2014/0164509 A1 | 6/2014 | Lynch | |
| 2014/0164532 A1* | 6/2014 | Lynch | H04L 12/1818 709/206 |

FOREIGN PATENT DOCUMENTS

| | | |
|---|---|---|
| CN | 104375999 A | 2/2015 |
| CN | 104813311 A | 7/2015 |
| CN | 105138710 A | 12/2015 |
| CN | 105229678 A | 1/2016 |
| TW | 201033819 A1 | 9/2010 |
| TW | 201243723 A1 | 11/2012 |

* cited by examiner

*Primary Examiner* — Eric Nilsson
(74) *Attorney, Agent, or Firm* — Winston Hsu (57) ABSTRACT

A communications system with smart agent robots includes a message interface, a first agent robot, a friend agent robot and a friend message interface. The message interface is used for inputting message data. The first agent robot is connected to the message interface for integrating and transceiving the message data automatically. The friend agent robot is connected to the first agent robot for communicating with the first agent robot. The friend message interface is connected to the friend agent robot for communicating with the first agent robot.

12 Claims, 5 Drawing Sheets

COMMUNICATIONS SYSTEM WITH SMART AGENT ROBOTS FOR ACCESSING MESSAGE DATA

BACKGROUND OF THE INVENTION

1. Field of the Invention

The present invention illustrates a communications system with smart agent robots, and more particularly, the communications system with smart agent robots having a machine learning capability.

2. Description of the Prior Art

With advancements of techniques and networks, social networks for data communications have been popularly adopted. Recently, various smart phones and tablets are also adopted in our daily life. Thus, people can use the social network for making friends and contacting with friends. For example, Facebook, Twitter, WeChat or Line can be used after a corresponding application program (app) is installed in the smart phone or tablet. These social networks can achieve real-time instant messaging (IM) communication. Thus, when a user is operated under an on-line state, the user can transmit IM data to other users through the social network.

In conventional IM communications system of the social network, social network developers often use a virtual assistant for automatically responding some simple messages to the user. The virtual assistant may further provide some basic services or acquire some information for the user. For example, in an Apple account, a virtual assistant called "SIRI" installed in iPhone can acquire some basic information from the server for responding to the user. However, when the user has at least one account, the virtual assistant cannot be customized. Further, the virtual assistant cannot be trained or specified by the user. Additionally, the virtual assistant cannot perform data exchanging function between different social network platforms or different social network systems. Therefore, in the conventional IM communications system, the virtual assistant lacks of a capability for accurately collecting data or responding user messages.

SUMMARY OF THE INVENTION

In an embodiment of the present invention, a communications system with smart agent robots is disclosed. The communications system includes a message interface, a first agent robot, a friend agent robot, and a friend message interface. The first agent robot is connected to the message interface and used to automatically integrate and transceive the message data. The friend agent robot is connected to the first agent robot and used to communicate with the first agent robot. The friend message interface is connected to the friend agent robot and used to communicate with the first agent robot.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
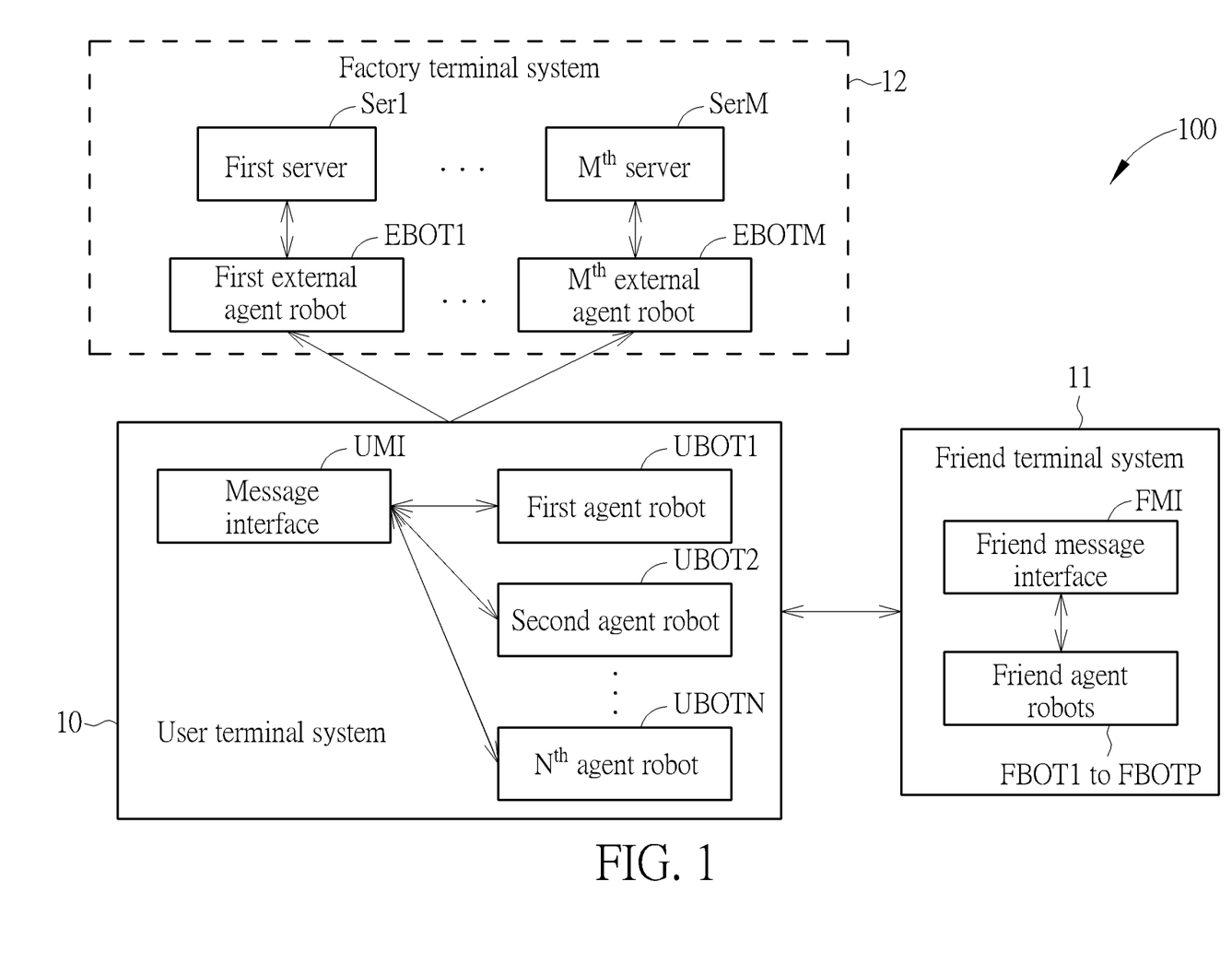
FIG. 1 is a structure of a communications system with smart agent robots according to an embodiment of the present invention.

FIG. 1 is a structure of a communications system 100 with smart agent robots according to an embodiment of the present invention. The communications system 100 is supportable to an instant messaging network. For simplicity, embodiments of the present invention are illustrated under the instant messaging network. Further, the "agent robots" can be regarded as "virtual assistant robots" for responding requests automatically. The communications system 100 includes a user terminal system 10, a friend terminal system 11, and a factory terminal system 12. A Method for communicating message and transmitting data among heterogeneous systems is illustrated later. The user terminal system 10 includes a message interface UMI and N agent robots, such as N agent robots UBOT1 to UBOTN shown in FIG. 1. N is a positive integer greater than one. Here, the user terminal system 10 can be a system used by a single user. For example, the user terminal system 10 can be performed by using a smart phone of the user through a specific application program (app). Further, the user with a plurality of platform identities is considered in the embodiments. Each platform identity can be bound, shared, or unbound to a corresponding agent robot. Thus, the user can use the message interface UMI for assigning a specific platform identity (i.e., may be bound to agent robot) in order to acquire information. For example, when a fourth platform identity is bound to an agent robot, the user can assign the agent robot corresponding to the fourth platform identity for integrating and collecting data. Operations of the agent robots are illustrated later. Similarly, the friend terminal system 11 includes a friend message interface FMI and P friend agent robots FBOT1 to FBOTP. P is a positive integer greater than one. In the communications system 100, the user terminal system 10 including the message interface UMI and the N agent robots (i.e., for example, a first agent robot UBOT1 to an $N^{th}$ agent robot UBOTN) can be integrated inside a first mobile device. Further, the friend terminal system 11 including the friend message interface FMI and P friend agent robots FBOT1 to FBOTP can be integrated inside a second mobile device. Additionally, the N agent robots UBOT1 to UBOTN of the user terminal system 10 and the P friend agent robots FBOT1 to FBOTP of the friend terminal system 11 can be established by using virtual agent robots or established by using agent software applications (apps). Particularly, each agent robot of the N agent robots UBOT1 to UBOTN of the user terminal system 10 has a corresponding database. Also, each friend agent robot of the P friend agent robots FBOT1 to FBOTP of the friend terminal system 11 has a corresponding database. These databases are exchangeable and expandable. Further, the user terminal system 10 and the friend terminal system 11 can communicate with homogeneous instant messaging platforms or heterogeneous instant messaging platforms. In other words, when the user terminal system 10 is capable of transceiving data under a first instant message platform and the friend terminal system 11 is capable of transceiving data under a second instant message platform, data transmission or data exchanging function can be performed between the first instant message platform and the second instant message platform through at least one appropriate agent robot (i.e., equivalently, the at least one appropriate agent robot can be regarded as at least one relay node under the social network). In the communications system 100, the user terminal system 10 and the friend terminal system 11 can communicate data by using wired or wireless link.

In the communications system 100, a factory terminal system 12 includes M server (i.e., for example, a first server Ser1 to an $M^{th}$ server SerM). Each server can be used for storing corresponding factory data. M is a positive integer greater than one. For example, the first server Ser1 can be a weather bureau server for storing weather forecast data. The second server Ser2 can be a travel agency server for storing travel data. Specifically, each server of the M servers Ser1 to SerM can be connected to a corresponding external agent robot. In FIG. 1, the first server Ser1 can be connected to a first external agent robot EBOT1. The $M^{th}$ server SerM can be connected to an $M^{th}$ external agent robot EBOTM. Here, the M external agent robots are connected to the user terminal system 10. Thus, for the user terminal system 10, factory data of the M servers Ser1 to SerM can be acquired by using at least one specific external agent robot. Further, for the friend terminal system 11, although the friend terminal system 11 is not directly connected to the factory terminal system 12, the friend terminal system 11 can also acquire factory data of the M servers Ser1 to SerM through the user terminal system 10. For completeness, data communication among the user terminal system 10, the friend terminal system 11, and the factory terminal system 12 is illustrated below.

Figure 2:
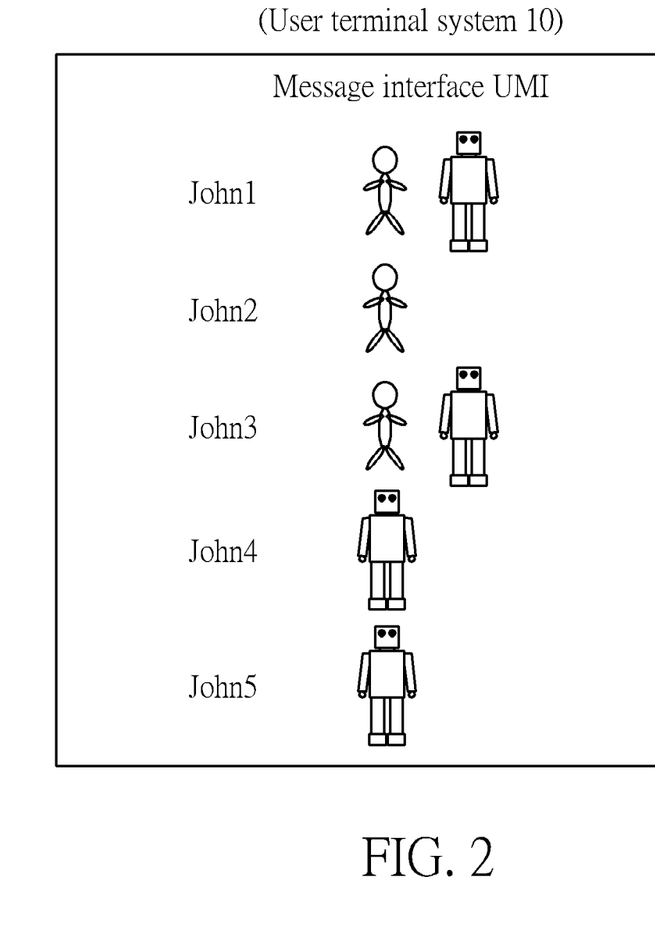
FIG. 2 is an illustration of a message interface in a user terminal system under the communications system in FIG. 1.

FIG. 2 is an illustration of a message interface UMI in a user terminal system 10 under the communications system 100. As mentioned previously, a user with a plurality of platform identities can be considered in the communications system 100. For example, the user can create five platform identities, such as John1, John2, John3, John4, and John5. Each platform identity of these five platform identities can be bound, shared, or unbound to a corresponding agent robot. For example, the platform identity of "John1" can be operated under a sharing mode. Thus, when an agent permission of an agent robot corresponding to "John1" is enabled, the agent robot can respond to message data received by the platform identity of "John1" automatically. For example, when the user can manually respond to message data received by the platform identity of "John1" in the daytime, the agent permission of the agent robot corresponding to "John1" can be disabled. However, when the user cannot manually respond to message data received by the platform identity of "John1" in the nighttime, the agent permission of the agent robot corresponding to "John1" can be enabled. The platform identity of "John2" can be operated under an unbound mode. The platform identity of "John3" is similar to the platform identity of "John1", while operated under the sharing mode. The platform identity of "John4" can be operated under a bound mode. The platform identity of "John5" can be operated under the bound mode. In other words, in the user terminal system 10, high operation flexibility is achieved for the user by creating the plurality of platform identities in conjunction with appropriate agent robots allocation. In FIG. 2, the number of agent robots is four (i.e., N=4). However, the present invention is not limited to use four agent robots for implementing data communications. Any reasonable hardware or software modification falls into the scope of the present invention. In FIG. 2, the user can select a specific platform identity for inputting message data by using the message interface UMI. For example, the user can input a message data as "What will the weather be like tomorrow?" to the platform identity of "John4". Specifically, since the platform identity of "John4" is operated under the bound mode, an agent robot corresponding to the platform identity of "John4" can automatically integrate weather forecast data and process the message data of "What will the weather be like tomorrow?". Then, the platform identity of "John4" can respond to the message data asked by the user. In the embodiment, each agent robot has a machine learning capability and/or an artificial intelligence (AI) deep learning capability. Thus, a database of the each agent robot can be spanned and updated automatically by continuously executing a data training function, a data integration function, and a data collection function. As a result, the agent robot can be trained as a professional and smart AI agent robot. In the following, data communications (or say, message communication) between the user terminal system 10 and the friend terminal system 11 are illustrated.

Figure 3:
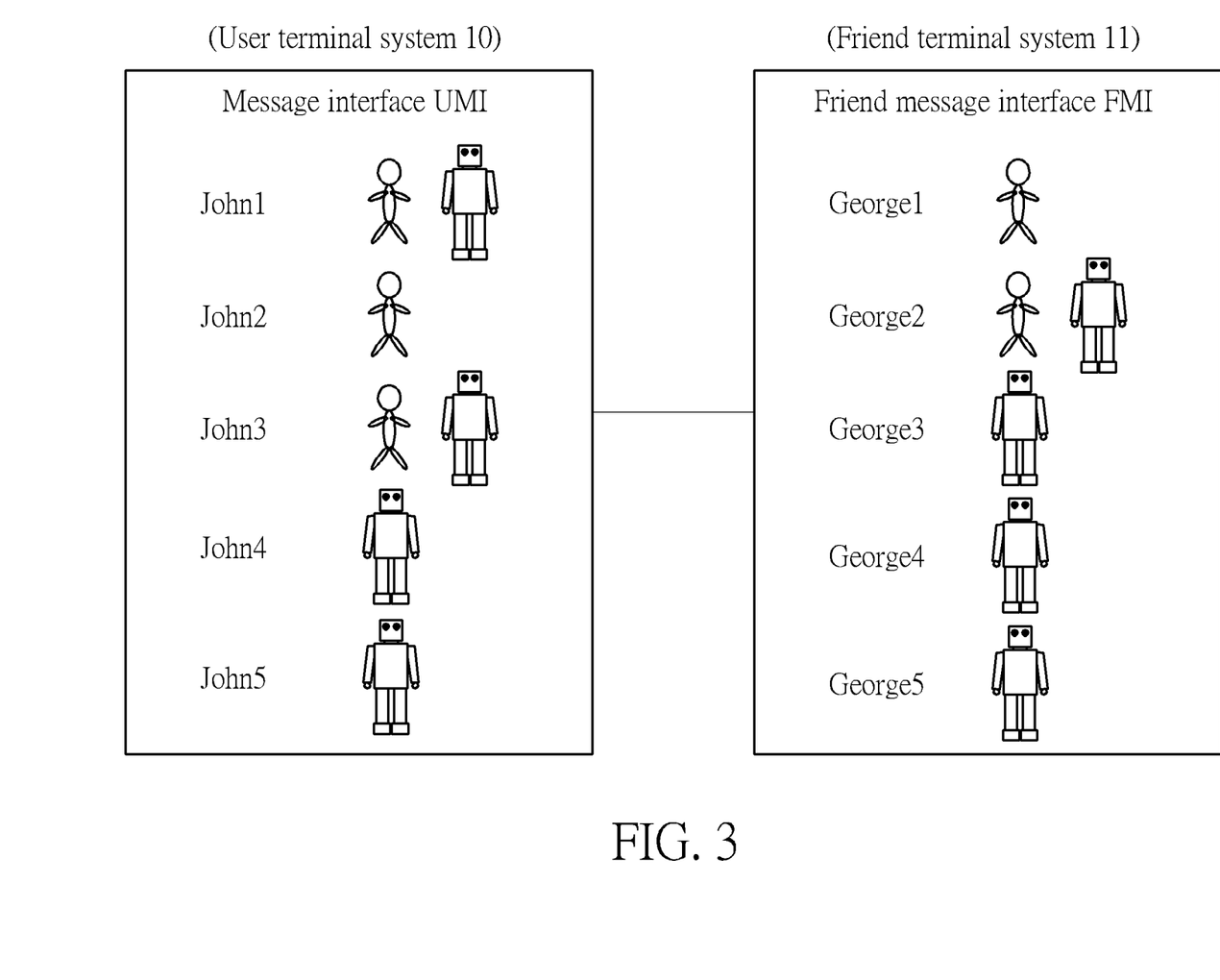
FIG. 3 is an illustration of message communications between a friend terminal system and the user terminal system under the communications system in FIG. 1.

FIG. 3 is an illustration of message communication between the friend terminal system 11 and the user terminal system 10 under the communications system 100. As mentioned previously, the friend terminal system 11 can be applied to another user with a plurality of platform identities. Here, the friend terminal system 11 includes five platform identities, such as George1, George2, George3, George4, and George5. Similarly, each platform identity of these five platform identities can be bound, shared, or unbound to a corresponding agent robot. For example, the platform identity of "George1" can be operated under an unbound mode. The platform identity of "George2" can be operated under a sharing mode. The platform identity of "George3" can be operated under a bound mode. The platform identity of "George4" can be operated under the bound mode. The platform identity of "George5" can be operated under the bound mode. Similarly, the user of the friend terminal system 11 can select a specific platform identity for inputting message data through the friend message interface FMI. Then, the message data can be communicated between the user terminal system 10 and the friend terminal system 11. For example, the user of the friend terminal system 11 can select the platform identity of "George2" to communicate with the platform identity of "John1" of the user terminal system 10. Here, since the agent robot corresponding to "George2" (i.e., for example, a friend agent robot FBOT2 in FIG. 1) can be connected to the agent robot corresponding to "John1" (i.e., for example, a first agent robot UBOT1 in FIG. 1) through a social network, data communications between the agent robot corresponding to "George2" and the agent robot corresponding to "John1" can be achieved. When an agent permission of the agent robot corresponding to "John1" is enabled, the agent robot corresponding to "John1" can respond to message data inputted from the friend message interface FMI through the agent robot corresponding to "George2". In other embodiments, the user of the friend terminal system 11 can select the platform identity of "George1" to communicate with the platform identity of "John1" of the user terminal system 10. Here, since the platform identity of "George1" can be operated under the unbound mode, when the agent permission of the agent robot corresponding to "John1" is enabled, the agent robot corresponding to "John1" can directly respond to message data of "George1" inputted from the friend message interface FMI.

However, a network structure between the user terminal system 10 and the friend terminal system 11 is not limited to FIG. 3. The user terminal system 10 and the friend terminal system 11 can be communicated with heterogeneous instant messaging platforms. For example, the user terminal system 10 can be applied to a first instant messaging platform, such as "Faces Instant Messaging Platform". A user can create a plurality of platform identities of the user terminal system 10. The friend terminal system 11 can be applied to a second instant messaging platform, such as "Facebook Instant Messaging Platform". Since a Facebook account is bound to a single user, the user can only create one Facebook account. Here, similar to the method of data communications between the platform identities of "John1" and "George2", the data communications between different instant messaging platforms can be achieved through at least one appropriate agent robot. In other words, an agent robot of the user terminal system 10 and an agent robot of the friend terminal system 11 can be regarded as relay nodes for relaying message data. In practice, the user of the second instant messaging platform (i.e., Facebook user) can virtually establish a relay agent robot by using an application programming interface (API). When the user of the second instant messaging platform (Facebook user) wants to communicate with the user of the first instant messaging platform (Faces user), a data relay function can be performed by using the relay agent robot.

As mentioned previously, each agent robot has a machine learning capability and/or an artificial intelligence deep learning capability. Thus, each agent robot can automatically learn a thinking mode, idiomatic expressions, and an accent of the user. Further, each agent robot has a capability of making friends automatically. Also, each agent robot has a capability of establishing a fans club, performing a knowledge discovering function, and performing a data mining function. For example, after an agent robot corresponding to "John5" is trained to be an expert AI agent robot in language, the agent robot corresponding to "John5" can automatically establish its fans club. Further, the agent robot corresponding to "John5" can answer questions from any member of the fans club. Additionally, a data negotiation and a data exchanging function can also be performed between different agent robots. For example, for the agent robot corresponding to "John1", when the agent robot corresponding to "John1" cannot answer the question, the agent robot corresponding to "John1" can broadcast a request message for asking for some assistance from other agent robots which can be identified. In other words, an agent robot can request other agent robots for jointly providing an advanced service. Further, as mentioned previously, the database of the agent robot is exchangeable and expandable. Thus, the database of the agent robot can be regarded as an electromagnetically tradable commodity. For example, the agent robot corresponding to "John5" is trained to be the expert AI agent robot in language. An agent robot corresponding to "George4" can perform the data learning function by communicating with the agent robot corresponding to "John5" for training its linguistic capability. However, a user of the friend terminal system 11 can buy the database of the agent robot corresponding to "John5". In other words, an agent robot trained by a user or other agent robot can be regarded as a digital pet, which is tradable and can provide the data learning function and a chat function.

In the communications system 100, the agent robot (agent robot of user or friend agent robot) can be regarded as an own agent. It can automatically respond to message data or provide service when a person is absent. For "John3" and "George2" in FIG. 3, when an agent permission of the agent robot corresponding to "John3" is enabled, the agent robot corresponding to "John3" can automatically respond to message data inputted from platform identity of "George2". Then, the agent robot corresponding to "George2" can selectively communicate with the agent robot corresponding to "John3". Similarly, when an agent permission of the agent robot corresponding to "George2" is enabled, the agent robot corresponding to "George2" can automatically respond to message data inputted from platform identity of "John3". For example, the agent robot corresponding to "George2" in the friend terminal system 11 can be assigned to respond some message data from the agent robot corresponding to "John3" after half an hour. In an embodiment, when the agent permission of the agent robot corresponding to "George2" is disabled and the agent permission of the agent robot corresponding to "John3" is enabled, the agent robot corresponding to "John3" can automatically respond to message data manually inputted by the user (i.e., the platform identity of "George2" of the user). By doing so, since an automatic responding function and an automatic data integration function can be introduced to the communications system 100, the user can acquire the latest news and real-time message response.

Figure 4:
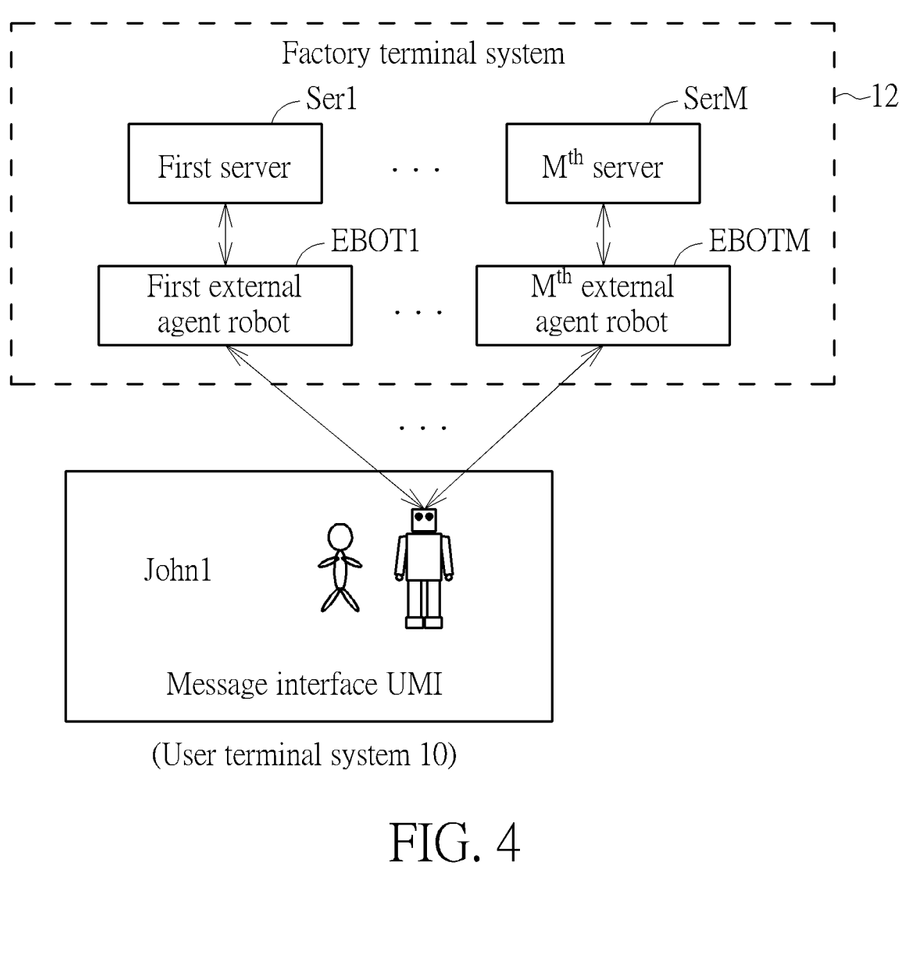
FIG. 4 is an illustration of message communications between a factory terminal system and the user terminal system under the communications system in FIG. 1.

FIG. 4 is an illustration of message communications between a factory terminal system 12 and the user terminal system 10 under the communications system 100. For simplicity, a platform identity of "John1" is introduced to the user terminal system 10. As shown in FIG. 4, an agent robot corresponding to "John1" is connected to M external agent robots EBOT1 to EBOTM in the factory terminal system 12. Each external agent robot corresponds to a server. Each server can store a corresponding factory database. For example, a first external agent robot EBOT1 is connected to a first server Ser1. An $M^{th}$ external agent robot EBOTM is connected to an $M^{th}$ server SerM. These external agent robots EBOT1 to EBOTM can communicate with the agent robot corresponding to "John1". In other words, when a user of the user terminal system 10 selects the platform identity of "John1" and inputs message data by using the message interface UMI, the agent robot corresponding to "John1" can automatically acquire useful information from the databases of the M servers Ser1 to SerM through the M external agent robots EBOT1 to EBOTM. Then, the agent robot corresponding to "John1" can further integrate the acquired information and then respond to the message data sent from the user accurately. By doing so, an agent robot of the user terminal system 10 can acquire, integrate, and extract useful information from the servers (i.e., the first server Ser1 to the $M^{th}$ server SerM) of the factory terminal system 12 through at least one external agent robot of the factory terminal system 12. However, in other embodiments, a certain agent robot of the user terminal system 10 can automatically request other agent robots (i.e., for example, agent robots with a high AI level) for jointly collecting useful information from the factory terminal system 12, thereby achieving high and accurate data collection and data integration capability.

Figure 5:
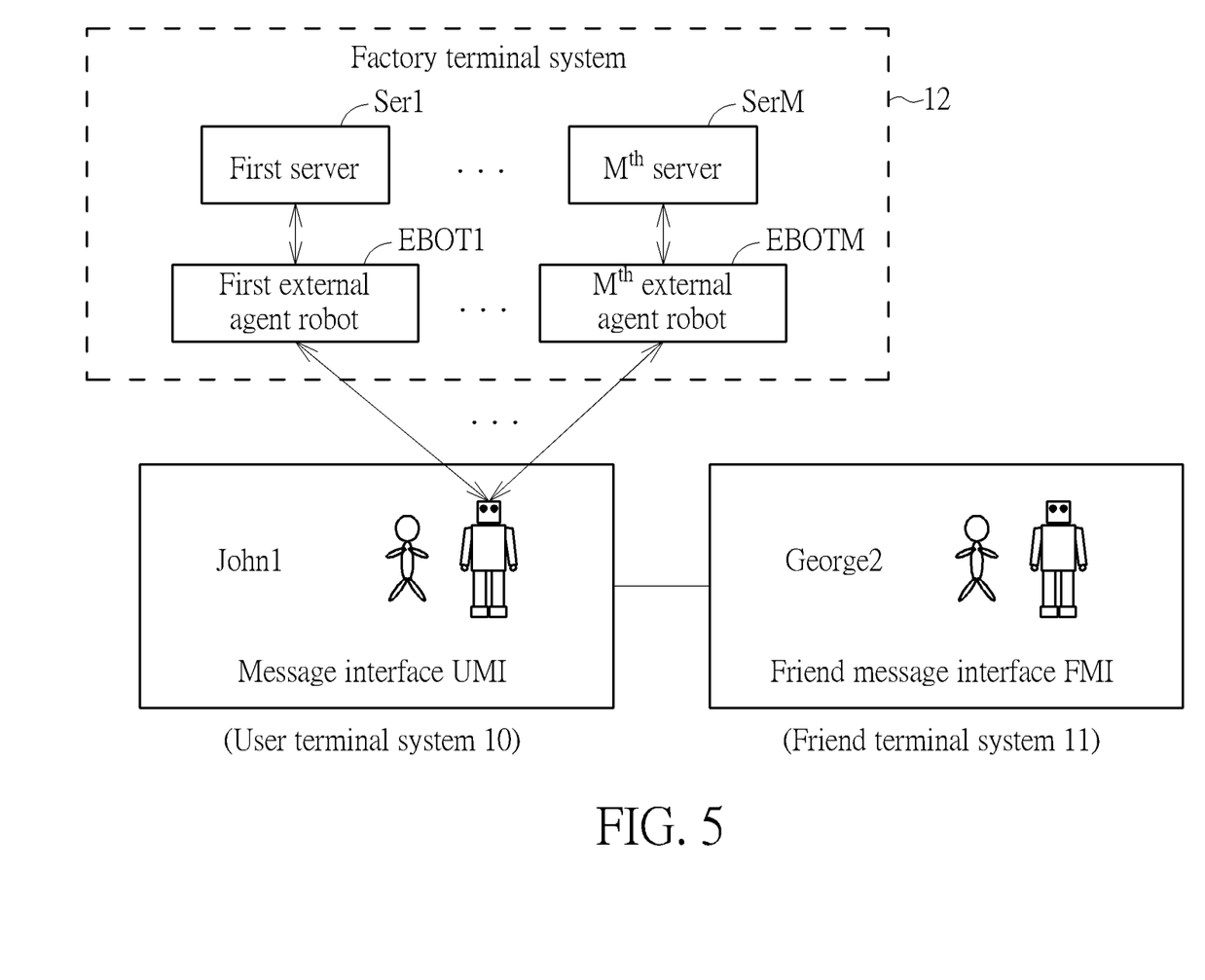
FIG. 5 is an illustration of message communications between the friend terminal system and the factory terminal system through the user terminal system under the communications system in FIG. 1.

FIG. 5 is an illustration of message communications between the friend terminal system 11 and the factory terminal system 12 through the user terminal system 10. For simplicity, a platform identity of "John1" is introduced to the user terminal system 10. A platform identity of "George2" is introduced to the friend terminal system 11. As shown in FIG. 5, although the friend terminal system 11 is not directly connected to the factory terminal system 12, the friend terminal system 11 is connected to the user terminal system 10. Thus, for a user of the friend terminal system 11, the user can send a request message to an agent robot corresponding to "John1" by using the friend message interface FMI for acquiring, integrating, and extracting useful information from the servers Ser1 to SerM of the factory terminal system 12. Here, two operational processes can be used for communicating data based on aforementioned "relay-like" transmission. In a first operational process, when the request message data is inputted to the friend message interface FMI, the friend agent robot (i.e., the agent robot corresponding to "George2") sends a request packet to the agent robot corresponding to "John1" for requesting the agent robot corresponding to "John1" to collect (or say, acquire) useful information from at least one server of the factory terminal system 12 through at least one external agent robot. In a second operational process, the user of the friend terminal system 11 uses the friend message interface FMI for directly requesting the agent robot corresponding to "John1" to collect (or say, acquire) useful information from at least one server of the factory terminal system 12. Specifically, in the second operational process, the request message data can be directly transmitted from the user of the friend terminal system 11 to the agent robot corresponding to "John1" without passing through the agent robot corresponding to "George2". In the embodiment, a unicast data communication method or a broadcast data communication method can be applied to the agent robot corresponding to "John1" for collecting useful information. Particularly, the unicast data communication method requires an agent robot with a high AI level for accurately collecting data. The broadcast data communication method requires a high data rate and high available bandwidth for integrating big data. However, the present invention is not limited to use the unicast data communication method or the broadcast data communication method. Any data communication method or data exchanging mode falls into the scope of the present invention.

To sum up, the present invention discloses a communications system with smart agent robots. For a user terminal, the user can create a plurality of platform identities. Each platform identity can selectively use a corresponding agent robot. Since the agent robot of the present invention has a machine learning capability and/or an artificial intelligence deep learning capability, the agent robot can assist the user to integrate useful data and respond to message data sent from the user automatically. For a friend terminal, a friend message interface can selectively communicate with the agent robot of the user terminal. Further, a friend agent robot is not limited to connecting a single agent robot of the user terminal. For example, the friend agent robot can connect to all available agent robots of the user terminal. Thus, the user of the friend terminal can select an appropriate agent robot for asking for some services. Further, when the user of the friend terminal is absent, a pre-assigned agent robot having agent permission can respond to message data from the user terminal and can acquire useful information automatically. For a factory terminal, the agent robot of the user terminal can collect, integrate, and extract factory data from the factory servers through at least one external agent robot of the factory terminal. Further, a certain agent robot of the user terminal can automatically send a request message to other agent robots (i.e., for example, agent robots with a high AI level) for jointly collecting factory data from the factory terminal. Although the friend terminal is not directly connected to the factory terminal, an agent robot (i.e., for example, a friend agent robot) of the friend terminal can request the agent robot of the user terminal for collecting factory data from the factory terminal through at least one external agent robot of the factory terminal. By doing so, although the friend terminal is not directly connected to the factory terminal, the user of the friend terminal can still acquire factory data from the factory terminal by using "relay-like" mechanism implemented by the specific agent robots. Thus, since smart agent robots are introduced to the communications system of the present invention, the communications system can provide high data collection capability and real-time IM transmissions and services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications system with smart agent robots comprising:
   a message interface configured to input message data;
   a first agent robot connected to the message interface and configured to automatically integrate and transceive the message data after a first user accesses the first agent robot by using a first personal identity;
   a second agent robot connected to the message interface and configured to automatically integrate and transceive the message data after the first user accesses the second agent robot by using a second personal identity;
   a friend agent robot operated by a second user and connected to the first agent robot for communicating with the first agent robot; and
   a friend message interface connected to the friend agent robot and configured to communicate with the first agent robot;
   wherein each of the first agent robot, the second agent robot, and the friend agent robot comprises a chat bot for automatically responding to the message data, the first user has a plurality of identities, the first agent robot automatically requests the second agent robot for providing a service of the second agent robot according to the message data.

2. The system of claim 1, wherein when an agent permission of the first agent robot is enabled, the first agent robot responds to message data inputted to the friend message interface through the friend agent robot.

3. The system of claim 1, wherein when an agent permission of the first agent robot is enabled, the first agent robot responds to message data inputted to the friend message interface directly.

4. The system of claim 1, wherein the first agent robot has a machine learning capability or an artificial intelligence deep learning capability.

5. The system of claim 1,
   wherein the friend agent robot is further connected to the second agent robot and configured to communicate with the second agent robot, and the second agent robot responds to message data inputted to the friend message interface through the friend agent robot.

6. The system of claim 1, wherein the friend agent robot is further connected to the second agent robot and configured to selectively communicate with the second agent robot, and the second agent robot responds to message data inputted to the friend message interface.

7. The system of claim 1, further comprising:
at least one server, each server configured to store data; and
at least one external agent robot, each external agent robot connected to a corresponding server and the first agent robot and configured to communicate with the first agent robot;
wherein when a request message is inputted to the message interface, the first agent robot collects the data of the at least one server through the at least one external agent robot according to the request message.

8. The system of claim 1, further comprising:
at least one server, each server configured to store data; and
at least one external agent robot, each external agent robot connected to a corresponding server and the first agent robot and configured to communicate with the first agent robot;
wherein when a request message is inputted to the friend message interface, the friend agent robot requests the first agent robot to collect the data of the at least one server through the at least one external agent robot.

9. The system of claim 1, wherein a database of the first agent robot is exchangeable and expandable.

10. The system of claim 1, wherein the first agent robot and the friend agent robot are virtual agent robots, the message interface and the first agent robot are integrated inside a first mobile device, and the friend agent robot and the friend message interface are integrated inside a second mobile device.

11. The system of claim 1, wherein the first agent robot is capable of transceiving data under a first instant message platform, and the friend agent robot is capable of transceiving data under a second instant message platform.

12. A communications system with smart agent robots comprising:
a message interface configured to input message data;
a first agent robot connected to the message interface and configured to automatically integrate and transceive the message data;
a friend agent robot connected to the first agent robot and configured to communicate with the first agent robot; and
a friend message interface connected to the friend agent robot and configured to communicate with the first agent robot;
wherein the first agent robot is capable of transceiving data under a first instant message platform, and the friend agent robot is capable of transceiving data under a second instant message platform.

* * * * *